(12) United States Patent
Peterson

(10) Patent No.: US 12,356,291 B2
(45) Date of Patent: *Jul. 8, 2025

(54) AUTOMATED TRACKING OF VEHICLE OPERATION AND SYNCHRONIZED MEDIA DELIVERY

(71) Applicant: QUANATA, LLC, San Francisco, CA (US)

(72) Inventor: Joel Peterson, San Francisco, CA (US)

(73) Assignee: QUANATA, LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/200,037

(22) Filed: May 22, 2023

(65) Prior Publication Data
US 2023/0300570 A1    Sep. 21, 2023

Related U.S. Application Data

(63) Continuation of application No. 17/317,106, filed on May 11, 2021, now Pat. No. 11,689,889, which is a
(Continued)

(51) Int. Cl.
*H04W 4/48* (2018.01)
*G01S 19/13* (2010.01)
(Continued)

(52) U.S. Cl.
CPC ............. *H04W 4/029* (2018.02); *G01S 19/13* (2013.01); *G06F 3/012* (2013.01); *G06F 3/013* (2013.01);
(Continued)

(58) Field of Classification Search
CPC ...... H04W 4/029; H04W 4/48; H04W 12/082; H04W 68/005; G06V 20/59; G01S 19/13;
(Continued)

(56) References Cited

U.S. PATENT DOCUMENTS 8,068,809 B2    11/2011  Lestreus
8,305,206 B2    11/2012  Miller et al.
(Continued)

FOREIGN PATENT DOCUMENTS

CN              103647691 A        3/2014

OTHER PUBLICATIONS

Cell Phone Features Can Help Prevent Texting and Driving, Trial Lawyers, Sansone & Lauber, Retrieved from https://www.missourilawyers.com/blog/cellphone-features-prevent-texting-driving/ Nov. 1, 2018.

*Primary Examiner* — Dai Phuong
(74) *Attorney, Agent, or Firm* — BRYAN CAVE LEIGHTON PAISNER LLP

(57) ABSTRACT

The described methods and systems decrease instances of distracted driving, encourage more frequent use of vehicle tracking services, and generally improve the risk profile of a driver and vehicle. These benefits are achieved by way of a vehicle computer system that incentivizes users to place mobile devices in a do-not-disturb (DND) mode and to activate vehicle tracking services. The vehicle computer system encourages these behaviors by enabling content delivery for devices within the vehicle based on the status of the mobile device(s) and the status of the vehicle tracking service(s).

21 Claims, 6 Drawing Sheets

Related U.S. Application Data continuation of application No. 16/708,501, filed on Dec. 10, 2019, now Pat. No. 11,039,279.

(51) Int. Cl.
| | |
|---|---|
| *G06F 3/01* | (2006.01) |
| *G06F 3/16* | (2006.01) |
| *G06V 20/59* | (2022.01) |
| *H04L 65/60* | (2022.01) |
| *H04W 4/029* | (2018.01) |
| *H04W 12/082* | (2021.01) |
| *H04W 68/00* | (2009.01) |
| *H04M 1/72463* | (2021.01) |

(52) U.S. Cl.
CPC .............. *G06F 3/165* (2013.01); *G06V 20/59* (2022.01); *H04L 65/60* (2013.01); *H04W 4/48* (2018.02); *H04W 12/082* (2021.01); *H04W 68/005* (2013.01); *H04M 1/72463* (2021.01)

(58) Field of Classification Search
CPC .......... G06F 3/012; G06F 3/013; G06F 3/165; H04L 65/60; H04M 1/72463
See application file for complete search history.

(56) References Cited

U.S. PATENT DOCUMENTS

| | | | |
|---|---|---|---|
| 8,527,013 B2 | 9/2013 | Guba et al. | |
| 9,319,856 B1* | 4/2016 | Riggs | ............... H04N 21/64753 |
| 9,743,260 B2 | 8/2017 | Wilson et al. | |
| 10,027,795 B1* | 7/2018 | Maguire | .................. G08B 3/10 |
| 10,531,245 B1 | 1/2020 | Schweinfurth et al. | |
| 10,783,559 B1 | 9/2020 | Tran | |
| 11,019,553 B1 | 5/2021 | Bhambhani et al. | |
| 2009/0261979 A1 | 10/2009 | Breed et al. | |
| 2011/0264246 A1 | 10/2011 | Pantoja et al. | |
| 2012/0258800 A1 | 10/2012 | Mikhailov | |
| 2014/0277932 A1* | 9/2014 | Prakah-Asante | ........................... H04M 1/72412 701/36 |
| 2014/0339211 A1 | 11/2014 | Barfuss et al. | |
| 2015/0050923 A1 | 2/2015 | Tu et al. | |
| 2015/0099480 A1 | 4/2015 | Reiter | |
| 2015/0244854 A1 | 8/2015 | Babel | |
| 2016/0050315 A1* | 2/2016 | Malhotra | ............ H04M 1/6075 455/414.1 |
| 2016/0205516 A1 | 7/2016 | Choi et al. | |
| 2016/0247480 A1 | 8/2016 | Li et al. | |
| 2017/0192620 A1 | 7/2017 | Kim et al. | |
| 2018/0077260 A1* | 3/2018 | Faltyn | ............... H04M 3/42323 |
| 2018/0091614 A1* | 3/2018 | Xie | ......... H04L 67/55 |
| 2018/0098635 A1 | 4/2018 | Jeon et al. | |
| 2018/0338033 A1* | 11/2018 | Boule | ..................... G01S 19/52 |
| 2019/0052747 A1 | 2/2019 | Breaux et al. | |
| 2019/0092474 A1 | 3/2019 | Morin et al. | |
| 2020/0244430 A1* | 7/2020 | Karabinis | ................. H04L 5/04 |
| 2020/0257492 A1 | 8/2020 | Wahlberg et al. | |
| 2020/0380806 A1 | 12/2020 | Tabata | |
| 2021/0004279 A1* | 1/2021 | Weksler | ................. G06F 9/542 |
| 2021/0044693 A1* | 2/2021 | Yu | ..................... H04M 1/72463 |
| 2021/0065894 A1* | 3/2021 | Weydt | .................. A61B 5/1118 |
| 2021/0176624 A1* | 6/2021 | Anderson | ......... H04M 1/72403 |
| 2022/0058407 A1* | 2/2022 | Yang | ........................ G06T 7/30 |

\* cited by examiner

AUTOMATED TRACKING OF VEHICLE OPERATION AND SYNCHRONIZED MEDIA DELIVERY

CROSS-REFERENCE TO RELATED APPLICATIONS

This application is a continuation of U.S. patent application Ser. No. 17/317,106, filed May 11, 2021, which is a continuation of U.S. patent application Ser. No. 16/708,501, filed Dec. 10, 2019, the disclosures of which are hereby expressly incorporated by reference herein in their entirety.

TECHNICAL FIELD

The present disclosure generally relates to monitoring an automated vehicle tracking service and a mobile device within a vehicle, and, more particularly, to synchronizing a media delivery service for devices in the vehicle with statuses of the vehicle tracking service and the mobile device.

BACKGROUND

Computers are increasingly integrated in vehicles and vehicle operation, and these computers grow more powerful and capable every year. For example, autonomous vehicles heavily rely on computer and sensor systems to control vehicle operation. Vehicle computers often collect data from various vehicle sensors, such as global positioning systems, speedometers, odometers, and body controllers. Further, vehicle computers are increasingly capable of integrating with other computer systems, giving users a connected and "intelligent" computing environment within the vehicle cabin. Many newer vehicles especially rely on vehicle computers and sensor systems—particularly vehicles autonomous driving, semi-autonomous driving, and other "intelligent" technology packages. While these vehicle computer systems enable more and better safety features over time, mobile devices simultaneously facilitate dangerous and distracted driving, such as internet browsing while driving, texting while driving, emailing while driving, and use of social media while driving.

SUMMARY

The described methods and systems decrease instances of distracted driving, encourage more frequent use of vehicle tracking services, and generally improve the risk profile of a driver and vehicle. These benefits are achieved by way of a vehicle computer system that incentivizes users to place mobile devices in a do-not-disturb DND mode and to activate vehicle tracking services. The vehicle computer system incentivizes these behaviors by enabling content delivery based on the status of the mobile device(s) and the status of the vehicle tracking service(s).

For example, in an embodiment, a vehicle computer system synchronizes a content delivery service (e.g., for providing content via a device within the vehicle) with: (i) a status or state of a DND mode of a mobile device associated with a driver of the vehicle, and (ii) a status or state of a vehicle tracking service for tracking the vehicle. For example, the vehicle computer system may stream or otherwise enable the delivery of media (e.g., audio such as podcasts, music, audiobooks, etc.) or a gamified user interface to the mobile device or to another computer in the vehicle when the vehicle computer system detects that both of the following conditions exist: (i) the mobile device is in a DND mode and (ii) the vehicle tracking service is active.

In an embodiment, if either the DND mode or the vehicle tracking service is not active, the vehicle computer system may halt the content delivery, thus encouraging users to activate (and keep activated) the vehicle tracking service and to keep their mobile devices (e.g., phones) in a DND mode.

Advantageously, when the mobile device is in a DND mode, the mobile device softens or deactivates alarms and notifications it might otherwise fully output (e.g., display or sound). Accordingly, the mobile device is less likely to distract the driver via notifications when in a DND mode. Further, when the driver is not distracted by notifications, the driver is less likely to be lured into a potentially dangerous follow-on activity distinct from the notification itself (e.g., responding to a text message notification by typing a text message response while driving).

Note, this summary has been provided to introduce a selection of concepts further described below in the detailed description. As explained in the detailed description, certain embodiments may include features and advantages not described in this summary, and certain embodiments may omit one or more features or advantages described in this summary.

BRIEF DESCRIPTION OF THE DRAWINGS

Each of the figures described below depicts one or more aspects of the disclosed system(s) or method(s), according to an embodiment. The detailed description refers to reference numerals included in the following figures.

DETAILED DESCRIPTION

Figure 1:
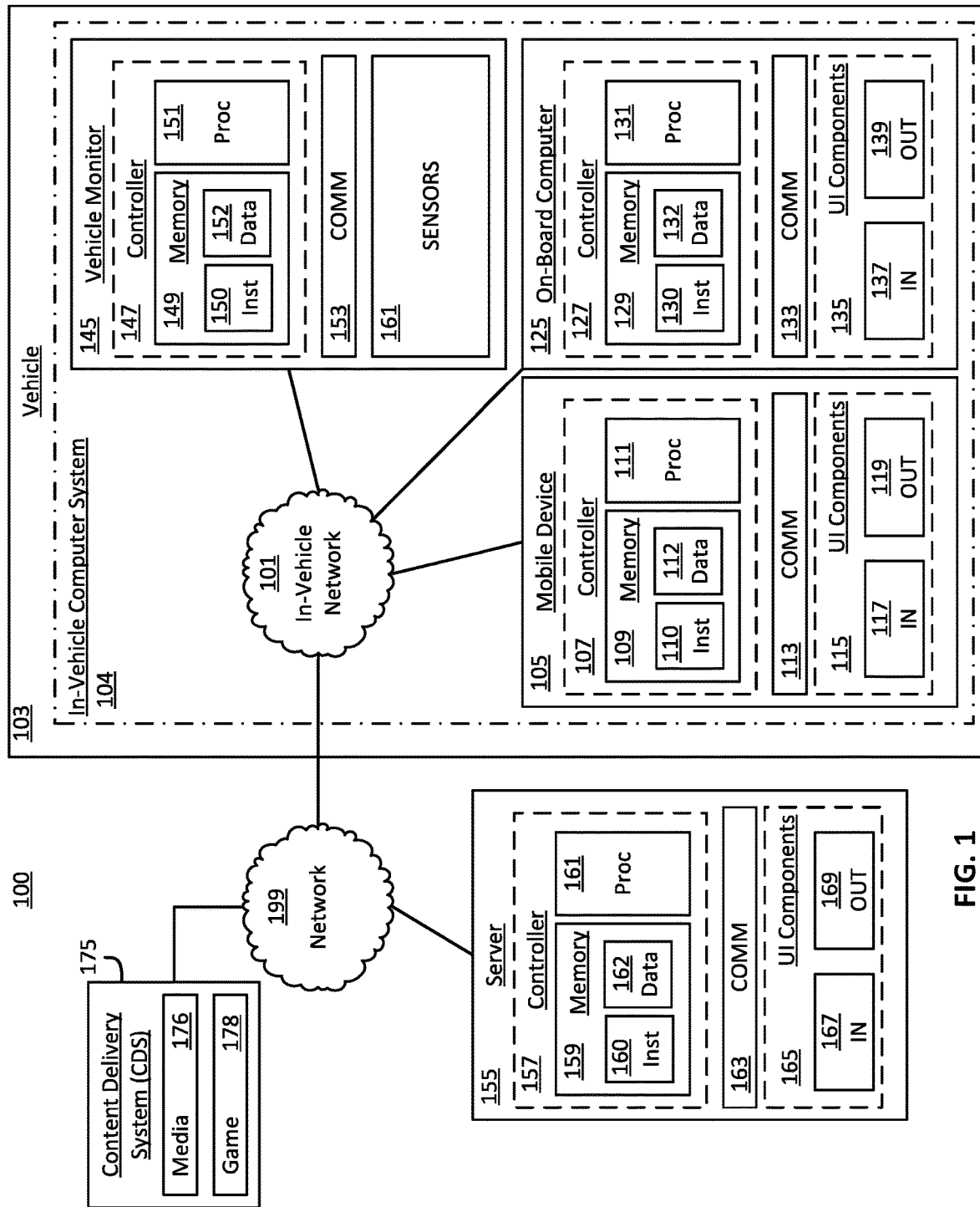
FIG. 1 is a block diagram of the example vehicle computer system for incentivizing safe vehicle operation and tracking of vehicle operation according to an embodiment.
Figure 2A:
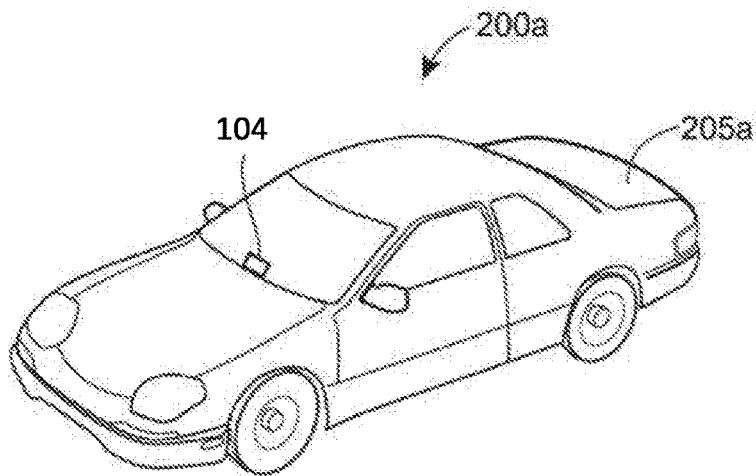
FIG. 2A depicts an example vehicle computer system for an automobile according to an embodiment.
Figure 2B:
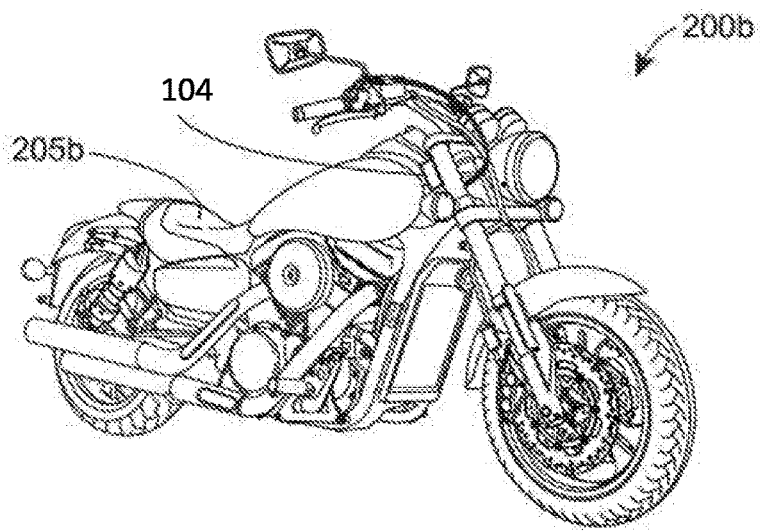
FIG. 2B depicts an example vehicle computer system for an motorcycle according to an embodiment.
Figure 2C:
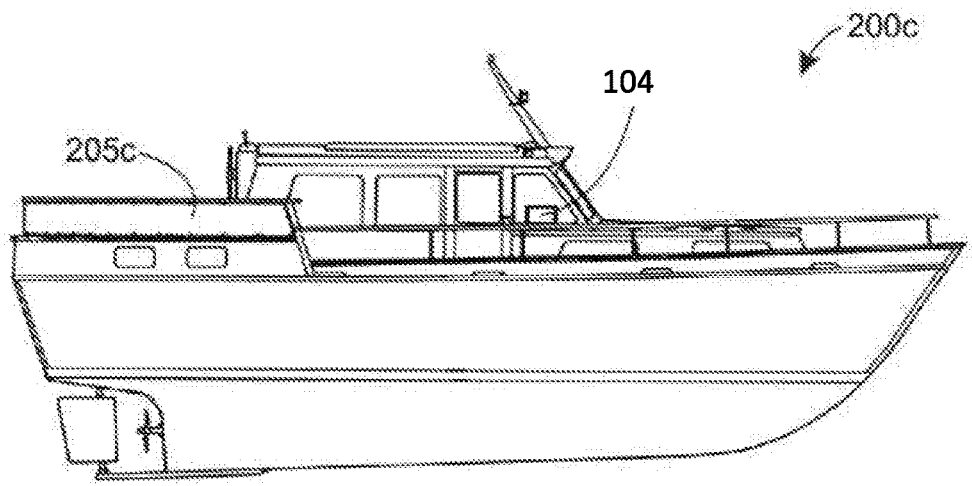
FIG. 2C depicts an example vehicle computer system for a watercraft according to an embodiment.
Figure 2D:
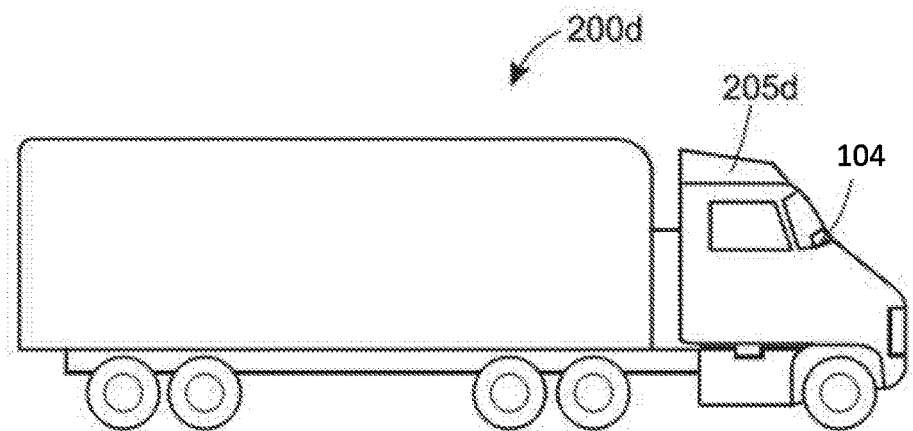
FIG. 2D depicts an example vehicle computer system for a commercial automobile according to an embodiment.
Figure 2E:
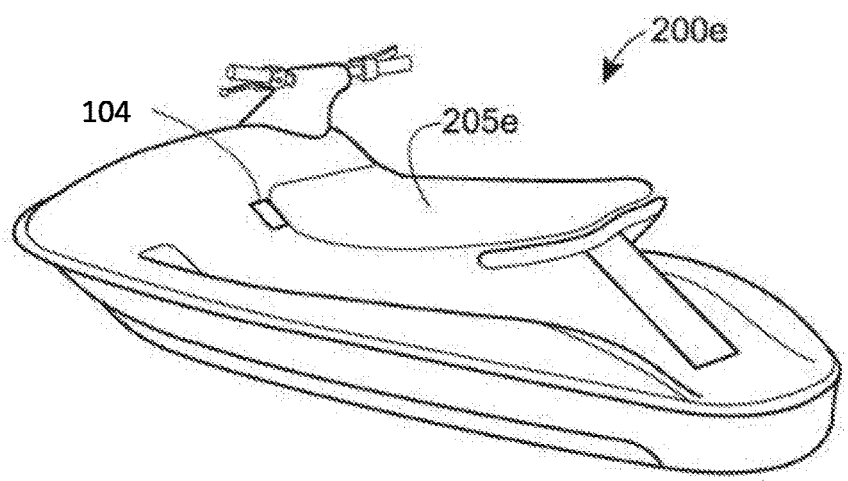
FIG. 2E depicts an example vehicle computer system for a personal watercraft according to an embodiment.
Figure 2F:
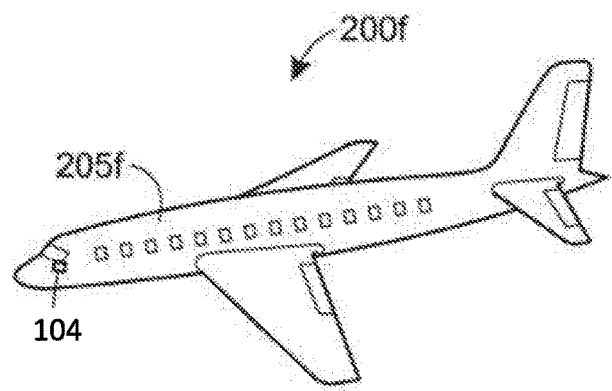
FIG. 2F depicts an example vehicle computer system for an aircraft according to an embodiment.
Figure 2G:
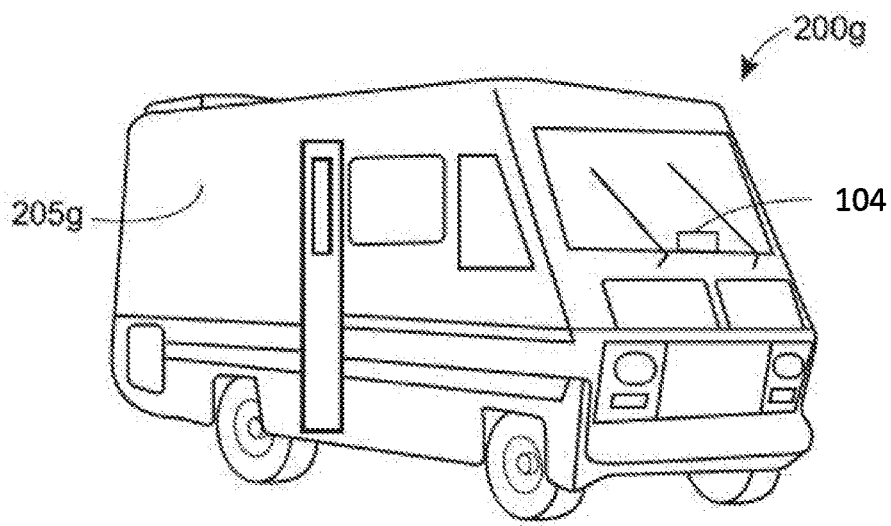
FIG. 2G depicts an example vehicle computer system for a recreational vehicle according to an embodiment.
Figure 2H:
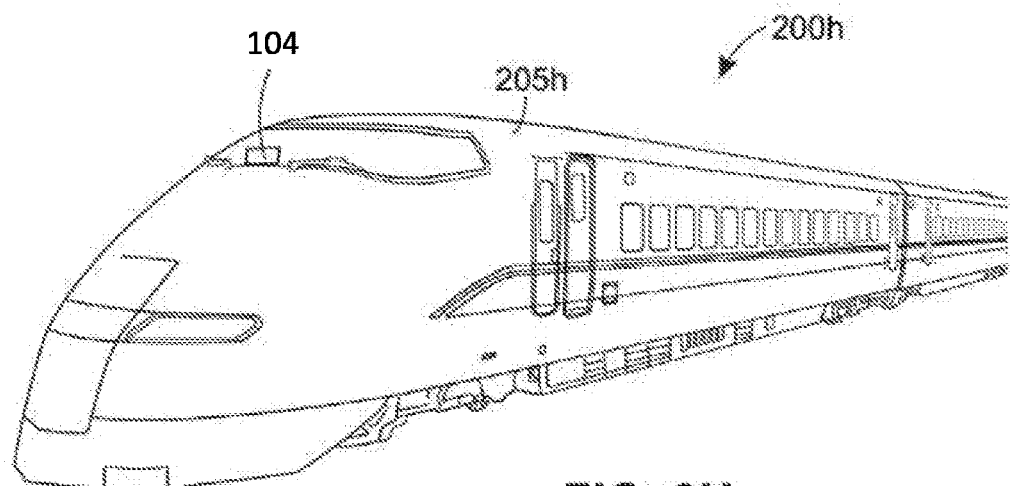
FIG. 2H depicts an example vehicle computer system for a train according to an embodiment.
Figure 2I:
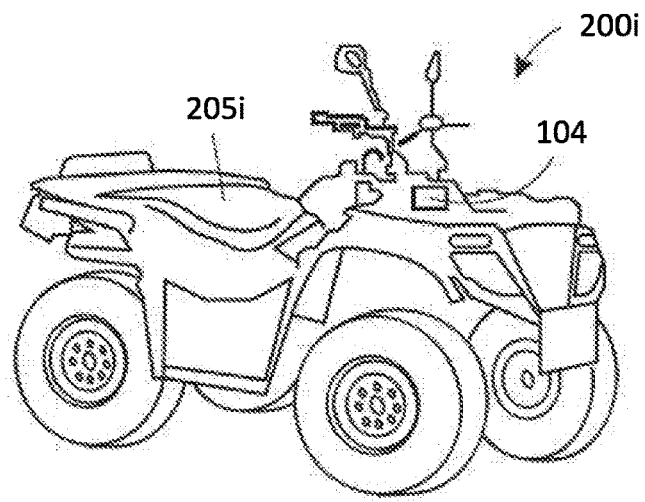
FIG. 2I depicts an example vehicle computer system for a four-wheeler according to an embodiment.
Figure 3:
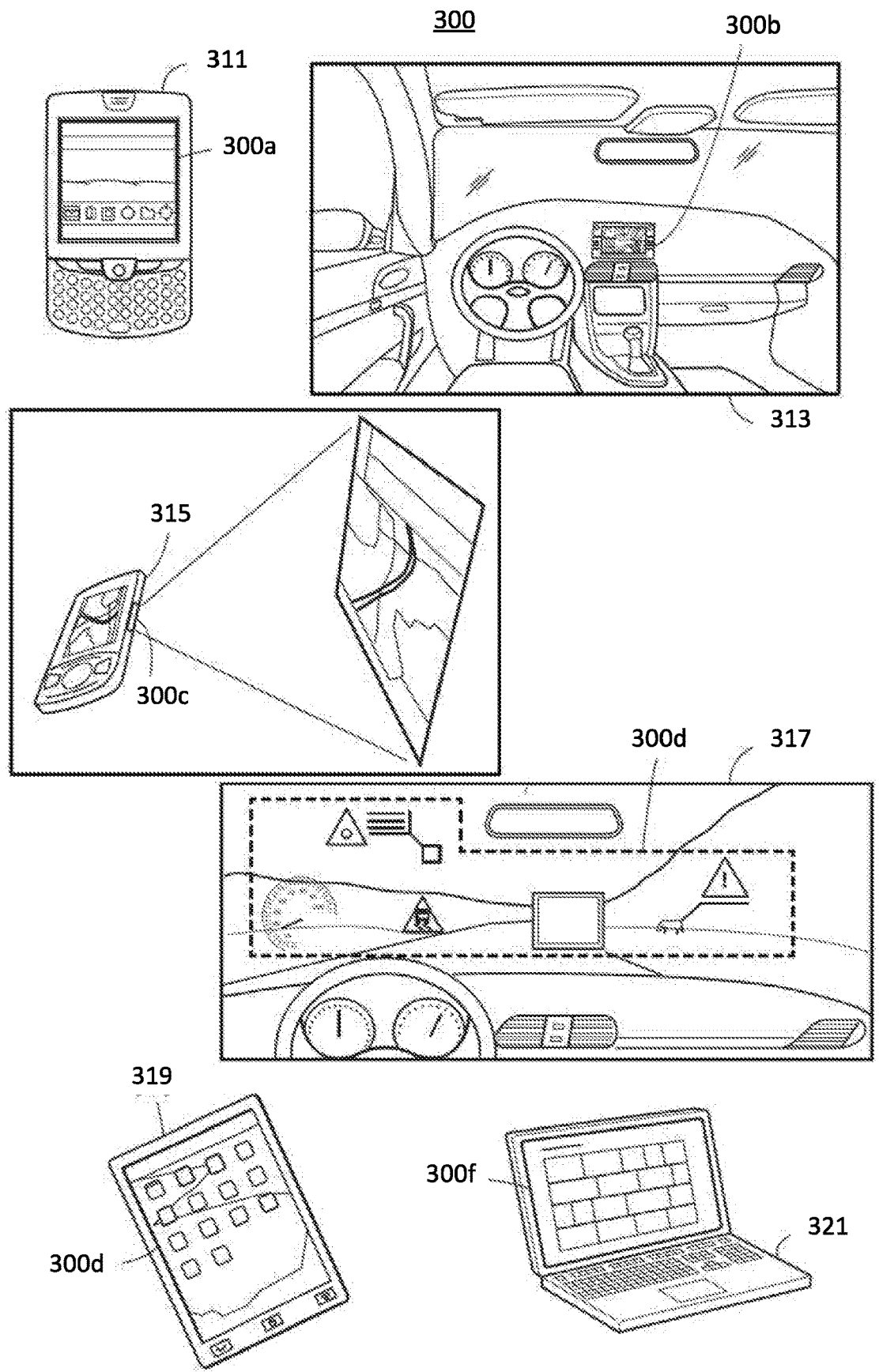
FIG. 3 depicts a set of example display devices according to various embodiments.
Figure 4:
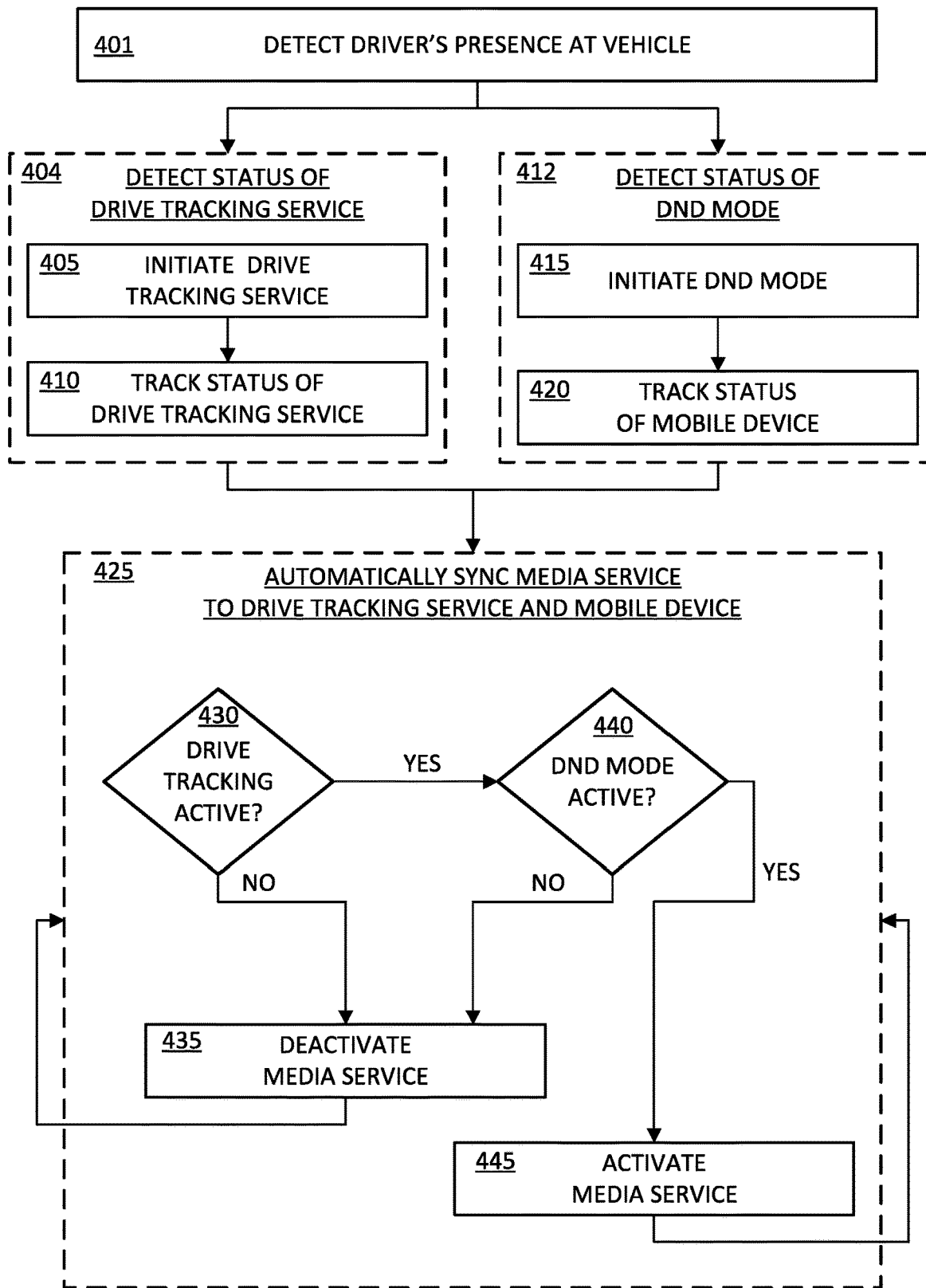
FIG. 4 illustrates an example method for incentivizing vehicle tracking and safe vehicle operation according to an embodiment.

Various techniques, systems, and methods are discussed below with reference to FIGS. 1-4. FIGS. 1-3 depict example systems and system components according to one or more embodiments, and FIG. 4 depicts a method that may be implemented via one or more of the systems shown in FIGS. 1-4.

Specifically, the following is described: (I) an example vehicle computer system 100 (shown in FIG. 1), configured to incentivize safe vehicle operation and tracking of vehicle operation for a vehicle 103, including an in-vehicle computer system 104 that includes a mobile device 105 (e.g., of a driver) and that is coupled to an external network 199; (II) example vehicles 200 (shown in FIGS. 2A-2I) that may be utilized in the system 100 in place of or in addition to the vehicle 103; (III) example displays 300 that may be utilized by the system 100 to display content delivered to one or more devices within the vehicle 103 or one of the vehicles 200; (IV) an example method 500 that may be implemented by the system 100; (V) additional considerations; and (VI) general terms and phrases.

In an embodiment, the system 100 syncs content delivery for one or more devices in the in-vehicle system 104 with the status of a DND mode of the mobile device 105 and a status of a vehicle tracking service for tracking the vehicle 103. For example, the system 100 may stream media (e.g., audio such as podcasts, music, audiobooks, etc.) to the mobile device 105 or another computer in the in-vehicle computer system 104 when it detects that the mobile device 105 is in DND mode and that the vehicle tracking service is active. If either the DND mode or the vehicle tracking service is de-activated, the system 100 may halt content delivery, thus encouraging users to activate the vehicle tracking service and to keep their mobile devices (e.g., phones) in DND mode. Advantageously, when the mobile device 105 is in DND, the mobile device 105 softens or deactivates alarms and notifications it might otherwise activate. Accordingly, the mobile device 105 is less likely to directly distract the driver via notifications. Further, when the driver is not distracted by notifications, the driver is less likely to be lured into a potentially dangerous follow-on activity (e.g., responding to a text message notification by typing a text message response while driving).

I. Example Vehicle Computer System 100

FIG. 1 is a block diagram of the example system 100 for incentivizing safe vehicle operation and tracking of vehicle operation according to an embodiment. The system 100 may include any one or more of: a network 199, the vehicle 103 (which may be coupled to the network 199), a server 155 that may be coupled to the network 199, and a content delivery system 175 that may be coupled to the network 199. The vehicle 103 may include the in-vehicle computer system 104, which may include the mobile device 105, an on-board computer 125, or a vehicle monitor 145.

A. Example Operation of the System 100

In an embodiment, the system 100 is configured to detect a user when he or she is in or near the vehicle 103. When the user is detected, the system 100 monitors a set of conditions and relies on those conditions to automatically initiate and stop content delivery to one or more devices in the vehicle 103. Specifically, the system 100 may rely on the conditions to automatically synchronize content delivery with a status of one or more mobile devices in the vehicle 103, a status of a vehicle tracking service, or both statuses.

As an example, the system 100 may monitor a first condition indicating whether or not the mobile device 105 is in a DND mode or a second condition indicating whether or not a vehicle tracking service for tracking the vehicle 103 is active (e.g., the service may be implemented via the vehicle monitor 145, and may be implemented for the purpose of analyzing risk associated with the driver or vehicle). These first and second conditions may be monitored by the server 155, which may coordinate with the CDS 175 to activate and deactivate content delivery from the CDS 175 to the in-vehicle computer system 104 based on the conditions tracked by the server 155.

The DND mode may be any suitable mode in which notifications of the mobile device 105 are muted, softened, or disabled. In some instances, the DND mode is an explicit mode (e.g., the mobile device 105 may have a mode explicitly labeled "do-not-disturb" mode). In other instances, references herein to "DND mode" refer to a state of operation for the vehicle in which one or more conditions exists. Generally speaking, these one or more conditions include: deactivated, silenced, or softened notifications; deactivated cellular or data connections that preclude one or more incoming messages from external devices via said connections; a sleep or hibernation state in which the phone is apparently asleep and thus not receiving communications or otherwise not providing normal notifications; a powered down state; etc.

For example, the DND mode may be an airplane mode that prevents the mobile device 105 from receiving calls or data (e.g., emails, text messages, etc.) from external devices. In an embodiment, the DND mode may be a state in which the volume of notifications is turned down to a quieter level or turned off completely. In the DND mode, vibration notifications may be left on if desired. In an embodiment, notification vibrations are disabled in DND mode. In an embodiment, in the DND mode, the mobile device 105 may continue to receive calls (e.g., which the driver may answer via a "speaker phone mode" provided by the mobile device 105 or the OBC 125). In an embodiment, the DND mode, the mobile device 105 does not receive calls or does not notify the driver of incoming calls.

In any event, in some instances, the system 100 automatically places the mobile device 105 in DND mode when the vehicle monitor 145 is activated. The vehicle monitor 145 may be automatically activated (e.g., when the vehicle 103 starts or when the vehicle 103 starts moving) or manually (e.g., a user may manually activate the monitor 145. In some instances, an input component (e.g., comprising software, hardware, or some combination thereof) may initiate both the DND mode and tracking of vehicle operation. For example, the mobile device 105 may include an app or widget that activates either or both the DND mode and the vehicle tracking service.

In any event, when the mobile device 105 is in DND mode and the vehicle monitor 145 is active, the system 100 may automatically trigger content delivery to the in-vehicle computer system 104 (e.g., originating from the CDS 175, which may be disposed external to the vehicle 103 or internal to the vehicle 103, depending on the embodiment). The system 100 may display or otherwise output the content via an output component such as a speaker or display of the in-vehicle system 104. The content may include any one or more of: audio (e.g., music, podcasts, or audio books from a streaming service), video, images, games, augmented-reality (AR) graphics (e.g., superimposed on a windshield as part of a heads-up display), or a map.

If the mobile device 105 ceases operating in DND mode or if the vehicle monitor 145 stops tracking and reporting vehicle operation, the system 100 may automatically stop content delivery from the CDS 175. Accordingly, users of the vehicle 103 are incentivized to both keep the vehicle monitor 145 active (thus enabling tracking and analysis of driver or vehicle behavior) and to keep the mobile device 105 in DND mode (thus improving the safety profile of the driver by mitigating potential distractions from the mobile device 105, such as alarms, phone calls, text messages, etc.).

In an embodiment, the system 100 may control operation of the vehicle 103 based on the status of vehicle tracking service. For example, vehicle tracking data may be analyzed to determine a driver is asleep or otherwise incapacitated, and the system 100 may respond by bringing the vehicle 103 to a stop. In an embodiment, autonomous operation of the vehicle 103 may be tied to the status of the vehicle tracking service. For example, in an embodiment, the vehicle 103 may only activate autonomous or semi-autonomous driving when the vehicle tracking service is active. Examples of semi-autonomous driving include adaptive cruise control, lane detection and steering correction, automatic parallel parking, etc.

B. Example Components of the System 100

The network 199 may be any suitable network and may include one or more nodes, links, or subnetworks (e.g., personal area networks, local area networks, wide area networks). The network 199 may include wireless or wired links or subnetworks. The network 199 may be a proprietary network, a secure public internet, a virtual private network or some other type of network, such as dedicated access lines, plain ordinary telephone lines, satellite links, combinations of these, etc.

The vehicle 103 may be any suitable vehicle (e.g., an automobile, a motorcycle, an engineering or heavy-duty vehicle such as a tractor or steamroller, etc.). The vehicle 103 may include an in-vehicle computer system 104, which may include an in-vehicle network 101. Like the network 199, the network 101 may be any suitable network and may include one or more nodes, links, or subnetworks (e.g., personal area networks, local area networks, wide area networks). The network 101 may include wireless or wired links or subnetworks. The in-vehicle system 104 may include a mobile device 105, an on-board computer 125, or a vehicle monitor device 145, any one of which may be coupled to the network 101.

In some embodiments, any one or more of the systems 105, 125, 145, 155, and 175 may communicate with any other of the systems 105-175 (or with any other suitable device or system not shown) via messages conforming to any suitable communication protocol (examples of which are described in the "Additional Considerations" section). When the network 199 includes the Internet, data communications may take place over the network 199 via one or more protocols from the Internet Protocol suite (e.g., TCP/IP). Thus, messaging between the server 155 and any one or more of the mobile device 105, the OBC 125, or the vehicle monitor 145 may conform with any one or more of these Internet Protocol suite protocols.

1. The Mobile Device 105

Generally speaking, the mobile device 105 is a portable computer system associated with a user (e.g., a driver or passenger of the vehicle 103), such as a tablet, a mobile phone, a laptop, or a wearable device (e.g., a smart watch, smart glasses, etc.). The mobile device 105 may include a controller 107 (e.g., including a memory 107 and a processor 111), a communication interface 113, and a set of UI components 115 including an electronic display device 119 and one or more touch sensors 117 (e.g., integrated into the display device 119). The display device 119 may be any suitable display and may include a screen, a projector, a heads-up interface, etc. The mobile device 105 may include additional or alternative UI components 115, including various input components 117 (e.g., electro-mechanical buttons or keys, a mouse, audio sensors or microphones, image sensors, motion sensors, etc.) or one or more output components 119 (e.g., an audio output such as a speaker, a motion generating component such as haptic motor for haptic feedback, etc.).

The memory 109 may include (i) a set of instructions 110 that, when implemented by the processor 111, cause the processor 111 to perform one or more operations describe herein with respect to the mobile device 105, and (ii) data 112 (e.g., including input data on which the processor 111 may operate or output data generated by the processor 111).

In example operation, the mobile device 105 enables functionality typically associated with tablets or mobile phones, such as web browsing, emailing, texting, data messaging, social media use, phone calling, etc.

2. The OBC 125

The on-board computer (OBC) 125 is a computer system disposed within and, if desired, integrated into, one or more components of the vehicle 103 (e.g., including a display on a dash of the vehicle). The OBC 125 may be permanently or temporarily installed in the vehicle 103.

The OBC 125 may include a controller 127 (e.g., including a memory 127 and a processor 131), a communication interface 133, and a set of UI components 135 including an electronic display device 139 and one or more touch sensors 137 (e.g., integrated into the display device 139). The display device 139 may be any suitable display and may include a screen, a projector, a heads-up interface, etc. In an embodiment, the display 139 is integrated into a dash, console, or seat of the vehicle 103. The display 139 may include a screen facing one or more of the seats of the vehicle or may including a projector to project images onto a windshield or other surface visible to the driver or passengers (e.g., a projection surface near the top or near the bottom of the windshield). As another example, the display 139 may not be integrated into the dash or other components of the vehicle 103. For example, the display 139 may be temporarily mounted or installed to a vent, windshield, or some other component of the vehicle 103.

In any event, the OBC 125 may include additional or alternative UI components 135, including various input components 147 (e.g., electro-mechanical buttons or keys, a mouse, audio sensors or microphones, image sensors, motion sensors, etc.) or one or more output components 149 (e.g., an audio output such as a speaker, a motion generating component such as haptic motor for haptic feedback, etc.).

The memory 129 may include (i) a set of instructions 130 that, when implemented by the processor 131, cause the processor 131 to perform one or more operations described herein with respect to the OBC 125, or (ii) data 132 (e.g., including input data on which the processor 131 may operate or output data generated by the processor 131).

In an embodiment, the OBC 125 includes or is otherwise communicatively coupled to a sensor system (not shown) that is installed or otherwise disposed in the vehicle 103 (e.g., via a wired or wireless link). For example, such a sensor system may include a speedometer; an accelerometer; one or more cameras, image sensors, laser sensors, RADAR sensors, or infrared sensors directed to the road surface or to potential obstacles on the road (e.g., for autonomous or semi-autonomous driving); a dedicated GPS receiver (not shown) disposed in the vehicle (e.g., in the interior, such as in the cabin, trunk, or engine compartment, or on the exterior of the vehicle); a compass; etc. The controller 127 may communicate with and rely on data from the sensor system to facilitate generating notifications for the user, controlling the vehicle 103 in an autonomous or semi-autonomous fashion, etc.

3. The Vehicle Monitor Device 145

The vehicle monitor device 145 is a computer system that may include a controller 147 (e.g., including a memory 147 and a processor 151), a communication interface 153, and a set of sensors 161. While not shown, the vehicle monitor 145 may include UI components similar to the UI components 115 and 135 in some embodiments.

The sensors 161 are configured to collect data to enable tracking of the behavior of the vehicle 103 (e.g., braking, accelerating/decelerating, swerving, proximity to other vehicles, adherence to lane markers and other road markers, adherence to speed limits, etc.) or of the driver specifically and distinct from observations of the vehicle (e.g., head pose or eye gaze direction indicating attention to the road, hand placement, etc.). The sensors 161 may include a speedometer; an accelerometer; one or more cameras, image sensors, laser sensors, RADAR sensors, or infrared sensors directed to the road surface, to potential obstacles on the road, or to the driver (e.g., for autonomous or semi-autonomous driving); a dedicated GPS receiver (not shown) disposed in the vehicle (e.g., in the interior, such as in the cabin, trunk, or engine compartment, or on the exterior of the vehicle); a compass; etc.

The memory 149 may include (i) a set of instructions 150 that, when implemented by the processor 151, cause the processor 151 to perform one or more operations described herein regarding vehicle monitor 145, or (ii) data 152 (e.g., including input data on which the processor 151 may operate or output data generated by the processor 151).

In example operation, the controller 147 receives an activation command (e.g., via an input component or via the communication interface 153). The activation command may originate at any of the server 155, the mobile device 105, or the OBC 125. In response to receiving the command, the controller 147 collects, via the sensors 161, data representing vehicle behavior or driver behavior. The controller 147 may transmit the data to the server 155 for analysis (e.g., to identify the behavior and a corresponding risk profile adjustment if necessary). In some embodiments, the data may be transmitted to the OBC 125 or the mobile device 105 for analysis. In an embodiment, the controller 147 performs the analysis.

The controller 147 may receive a deactivation command via an input component or via the communication interface 153. Again, this command may originate at any of the server 155, the mobile device 105, or the OBC 125. In response to receiving the deactivation command, the controller 147 stops collecting data via the sensors 161. In an embodiment, the controller 147 responds to the deactivation command by stopping the reporting of collected data for analysis, but continues to collect data via the sensors 161. The data may be stored locally to the memory 149 in such an embodiment. If desired, a user may have control over the collected data (e.g., he or she may have control over whether or not the data is collected while the tracking service is off, or control over whether or not the data is eventually reported for analysis).

It will be understood that one or more components of the vehicle monitor 145 (e.g., the controller 147) may be characterized as a vehicle monitor circuit, and that any circuit providing the functionality described herein as being provided by the vehicle monitor 145 may be referred to as a "vehicle monitor circuit."

4. The Server 155

The server 155 is a computer system that may include a controller 147 (e.g., including a memory 157 and a processor 161), a communication interface 163, and a set of user interface (UI) components 165 (e.g., including an input component 167 and an output component 169). One or more of the UI components 165 may be the same as, or similar to, the previously described UI components 115 and 135. The memory 159 may include (i) a set of instructions 160 that, when implemented by the processor 161, cause the processor 161 to perform one or more operations described herein with respect to the server 155, or (ii) data 162 (e.g., including input data on which the processor 161 may operate or output data generated by the processor 161).

In example operation, the server 155 coordinates the status(es) or condition(s) of the devices or services in the in-vehicle computer system 104 with the content delivery service provided via the CDS 175. For example, the server 155 may transmit messages to the CDS 175 to (i) cause the CDS 175 to activate content delivery when both the DND mode is active and the vehicle tracking service is active and (ii) cause the CDS 175 to deactivate content delivery to the system 104 when either the DND mode or the vehicle tracking service goes inactive.

As an additional example, the server 155 may receive data collected by the vehicle monitor 145. This data may represent behavior of the vehicle 103 or of the driver of the vehicle. The server 155 may analyze the data to determine a level of riskiness associated with the driver based on the analyzed behavior. The level may be an integer or float variable scaled from 0-100 (e.g., where 50 represents a median risk level). As another example, the level may have one of a predetermined set of values such as "low risk," "average risk," "high risk" (or, e.g., a corresponding 1, 2, or 3 representing risk levels). Ultimately, an insurance company may rely on the calculated level of riskiness to determine a monthly premium to charge the driver.

5. The Content Delivery System 175

The content delivery system (CDS) 175 may be a host or server (or multiple servers) including memory (not shown) storing media 176 or a game 178. The CDS 175 may be configured to deliver the media 176 or game 178 to a requesting device (e.g., via streaming or via transmission for local download and replay by the requestor). The requesting device may be any one or more of: the mobile device 105, the OBC 125, or the vehicle monitor 145.

In some instances, the CDS 175 streams the media 176 by transmitting on-demand (i.e., not necessitating long term storage at the system 104). In an embodiment, a copy of the media 176 may be stored at a memory of the system 104. The CDS 175 may transmit messages initiating or halting the display or output of the media 176 at the system 104.

The media 176 may be any suitable piece of audio or visual media. For example, the media 176 may be a set of songs, audiobooks, premium radio, etc. The game 178 may be any suitable game or gamified interface appropriate to display or otherwise provide to a user while the user is driving.

C. Other Aspects of the Vehicle Computer System 100

Depending on the embodiment, the vehicle computer system 100 may have various configurations. For example, in an embodiment the vehicle computer system 100 may include only the in-vehicle system 104. In other words, the functionality of the vehicle computer system 100 may be provided entirely by the in-vehicle system 104 in some embodiments. As such, the vehicle computer system 100 may be a "stand-alone" system that does not require connection to an external network such as the network 199 in some embodiments.

In an embodiment, the in-vehicle computer system 104 may include only the mobile device 105, only the OBC 125, or only the vehicle monitor 145. In other words, the functionality of the vehicle computer system 104 may be provided entirely by a single device in some embodiments. Indeed, each of the mobile device 105, the OBC 125, and the vehicle monitor 145 may perform some or all of the processing associated with the system 100 (e.g., also described with reference to FIG. 4) in some embodiments. For example, the mobile device 105 may include an application that collects data for the vehicle tracking service.

In some embodiments (and as shown in FIG. 1), the vehicle computer system 100 may be a distributed system where the functionality of the vehicle computer system 100 is divided between the components 105-175. More generally speaking, although the vehicle computer system 100 is shown including one server 155, one mobile device 105, one OBC 125, one vehicle monitor 145, and one CDS 175, it will be understood that zero, one, or a plurality of each may be utilized depending on the embodiment.

In an embodiment, the processing performed by the server 155 or the CDS 175 may be distributed among a plurality of servers in an arrangement referred to as "cloud computing." This configuration may provide several advantages, such as enabling near real-time uploads and downloads of information as well as periodic uploads and downloads of information. This may provide for a thin-client embodiment of the mobile device 105, the OBC 125 or the vehicle monitor 145, as well as a primary backup of some or all of the data gathered by the mobile any of the devices 105, 125, or 145.

Further, if desired, a database (e.g., implemented by the server 155) may store data related to the operation of the vehicle computer system 100. Such data might include, for example, data collected by a mobile device 105, the OBC 125, or the vehicle monitor 145. Such data may pertain to the vehicle computer system 100 and may be uploaded to the server 155 (e.g., images, sensor inputs, data analyzed according to the methods discussed below, or other kinds of data). The server 155 may access data stored in such a database when executing various functions and tasks associated with the operation of the vehicle computer system 100. The data in such a database may be stored at one or more memory devices included within, or otherwise communicatively connected to, the server 155.

In an embodiment, any one or more of the devices 105, 125, and 145 may drive any one or more of the displays 119, 139, and 159 if desired. Further, it will be appreciated that any one or more of the UI components 115, 135, or 15 may be referred to as "UI devices."

Below, the example vehicles 200 and the example displays 300 are described in more detail before turning to the example method 400, which may be implemented by the system 100.

II. Example Vehicles 200a-200i

Turning to FIGS. 2A-2I, various embodiments of vehicle computer systems 200a-200i are shown, each of which may be similar to the vehicle computer system 100 shown in FIG. 1A and each of which may provide the same or similar functionality to that described regarding the system 100. The vehicle computer systems 200a-200i include vehicles 205a-205i, each of which may include the in-vehicle computer system 104 shown in FIG. 1 or some version thereof.

Specifically, the system 104 may be implemented utilizing any of the following vehicles: (a) an automobile 205a as shown in FIG. 2A; (b) a motorcycle 205b as shown in FIG. 2B; (c) a watercraft (e.g., yacht or commercial ship) 205c as shown in FIG. 2C; (d) a commercial automobile (e.g., a semi-truck) 205d as shown in FIG. 2D; (e) a personal watercraft (e.g., a jet-ski) 205e as shown in FIG. 2E; (f) an aircraft 205f as shown in FIG. 2F; (g) a recreational vehicle (e.g., a camper) 205g as shown in FIG. 2G; (h) a train 205h as shown in FIG. 2H; or (i) a four-wheeler 200i as shown in FIG. 2I.

III. Example Displays 300

FIG. 3 illustrates a set of example display devices 300 according to various embodiments, including example displays 300a-300f. Each of the display devices 300 may be part of the system 100 shown in FIG. 1, and each may be utilized in place of or in addition to any one or more of the display devices shown in FIG. 1. Each display device 300 may be similar in nature to any of the display devices 119, 139, or 159 shown in FIG. 1, capable of performing similar functions and interfacing with the same or similar systems; and each of the devices 105, 125, and 145 may provide output via any of the displays 300a-300f, in addition to or in place of the displays 119, 139, or 159, if desired.

In an embodiment, the display devices 300 may display the media data 176 or the game data 178 shown in FIG. 1. More generally, each of the display devices 300 may present visual information based on video data or image data received from any of the devices 105, 125, or 145 shown in FIG. 1.

As shown, the display device 300a is a screen of a mobile phone 311 (e.g., representing an example of the mobile device 105). The display device 300b is an in-dash display for a vehicle 313 (e.g., representing an example of the vehicle 103). The display device 300c is a projector for a projector device 315 (e.g., representing an example of the mobile device 105). The display device 300d is a heads-up display (HUD) for a vehicle (e.g., the vehicle 103) projected onto a windshield 317. The display device 300e is a screen for a tablet 319 (e.g., representing an example of the mobile device 105). The display device 300F is a screen for a laptop 321 (e.g., representing an example of the mobile device 105).

IV. An Example Method 400 for Incentivizing Vehicle Tracking and Safe Vehicle Operation FIG. 4 illustrates an example method 400 for incentivizing vehicle tracking and safe vehicle operation according to an embodiment. The method 400 may be implemented, in whole or in part, by the system 100 shown in FIG. 1. The method 100 may be saved to a memory (e.g., any one or more of the memories 109, 129, 149, or 159) as one or more instructions or routines.

At a high level, in an example implementation of the method 400, the system 100 may perform any one or more of the following functions: (a) detect a user (block 401); (ii) detect a first condition indicating a drive tracking service is active (e.g., wherein vehicle operation is tracked by the vehicle monitor 145) (block 404); (iii) detect a second condition indicating the mobile device 105 is in DND mode (block 412); and (iv) automatically synchronize a content delivery service (e.g., provided by the CDS 175 shown in FIG. 1) to a device within the vehicle 103 (block 425).

A. Detecting a Driver's Presence (Block 401)

The system 100 may detect a user (block 401). In an embodiment, the system 100 automatically detects the user. For example, the system 100 may detect the mobile device 105 automatically connecting (e.g., via Bluetooth or wifi) to the OBC 125. As another example, the OBC 125 of the vehicle 103 may include a proximity sensors (e.g., utilizing: photo sensors that emit and detect reflected visible or non-visible light; RADAR; a camera: laser sensors; infrared sensors detecting the user's body heat as she approaches the vehicle; etc.). As yet another example, the system 100 may rely on a position sensor (e.g., GPS) of the mobile device 105 to determine the user is in or near the vehicle 103. In some instances, the mobile device 105 or the OBC 125 may, when configured to detect the user's presence as described herein, may be referred to as "user detection circuits" or as including "user detection circuits."

In an embodiment, the system 100 detects the user based on user input. As an example, the system 100 may detect the vehicle 103 starting (e.g., the ignition being used, the engine starting, etc.). The system 100 may detect a user activating the vehicle monitor 145 (e.g., via a button on a housing of the vehicle monitor 145 or via a software button displayed on one of the displays 119, 139, 159).

B. Detecting an Active Drive Tracking Service (Block 404)

The system 100 may detect a status of a drive tracking service (e.g., indicating whether or not the vehicle monitor 145 is tracking vehicle operation) (block 404). A variable representing the condition may be stored to a memory of the system 100, and may be adjusted by a controller of the system 100 in response to detecting a change in the status of the drive tracking service. The block 404 may include a set of blocks 405 and 410.

In example operation, a user, the server 155, or the OBC 125 may activate a tracking service implemented via the vehicle monitor 145 (block 405). In an embodiment, the tracking service is automatically activated in response to a trigger. The trigger may be: a detection of the vehicle 103 starting; a detection of the mobile device 105 or of a user in or near the vehicle; a detection of a communication connection (e.g., Bluetooth) between the mobile device 105 and another device within the system 104; a detection of a preconfigured setting indicating the service should start automatically; or some combination thereof. When the tracking service is active, the vehicle monitor 145 may transmit data to the server 155 regarding behavior of the vehicle 103. For example, the data may indicate miles driven, a particular path driven, acceleration/deceleration information, braking information, swerving information, distance from nearest car information, time stamps, information regarding the driver's eye gaze (e.g., indicating how often the driver is looking at the road vs somewhere else), information regarding the driver's hand placement on the steering wheel, etc. The server 155 may analyze the data, and the results of the analysis may be utilized to assign a level of riskiness to the driver, which may be used to determine an insurance rate for the driver. In some embodiments, the tracking service is implemented by the mobile device 105 or the OBC 125 or by some combination of the devices 105, 125, and 145.

The system 100 may detect that the tracking service has been activated by monitoring the vehicle monitor 145 (block 420). For example, the vehicle monitor 145 may transmit a signal to the mobile device 105, the OBC 125, or the server 155 carrying a message indicating the tracking service has been activated.

C. Detecting an Active DND Mode (Block 412)

The system 100 may detect a status of a DND mode of the mobile device 105 (block 412). The block 412 may include blocks 415 and 420.

In example operation, the mobile device 105 may initiate DND mode (block 415). This initiation may be automatic (e.g., triggered by a trigger other than a user) or manual (e.g., triggered by a user). For example, automatic initiation may occur in response to detecting the tracking service is active. As an example, the monitor 145 may transmit a message to the mobile device 105 directly (e.g., via a PAN such as Bluetooth or NFC or via wifi) or indirectly (e.g., via the OBC 125 or the server 155), wherein the message indicates the tracking service is active. As another example, the DND mode may be automatically triggered by detecting that the vehicle 103 has started or is moving. For example, utilizing internal sensors, the mobile device 105 may detect and analyze a speed and direction to determine the mobile device is moving in a vehicle, and may trigger the DND mode. As another example, the OBC 125 may communicate with the mobile device 105 directly or indirectly to notify that mobile device 105 that the vehicle 103 has started or is moving, and the mobile device 105 may respond to the notification by automatically entering DND mode. In some instances, any suitable combination of these described triggers may be used or required to automatically trigger DND mode. In some instances, a user manually places the mobile device 105 in DND mode (e.g., by interacting with a button displayed via a GUI of the mobile device 105.

The system 100 may detect that the DND mode is active by tracking or monitoring the mobile device 105 (block 420). For example, the server 155, the OBC 125, or the vehicle monitor 145 may periodically transmit a message to the mobile device 105, requesting a verification message from the mobile device 105 that verifies the status of mobile device 105 with respect to the DND mode. In an embodiment, the mobile device 105 reports state changes to and from DND mode (e.g., to the server 155 or the OBC 125). According, the server 155 may receive a notification of each state change in and out of DND mode, enabling the server 155 to track the status of the DND mode and to coordinate content delivery accordingly.

D. Automatically Sync the Media Service to Drive Tracking Service and DND Mode (Block 425)

The system 100 may automatically synchronize a content delivery service (e.g., provided by the CDS 175) to a device within the vehicle 103 (block 425).

In example operation, the system 100 may: (i) respond to receiving or detecting the status of the drive tracking service by determining whether or not the status indicates the drive tracking service is active (block 430); and (ii) respond to receiving or detecting the status of the DND mode of the mobile device 105 by determining whether or not the status indicates the DND mode is active (block 440).

As shown, if either the driver tracking service is inactive or the DND mode is inactive, the system 105 deactivates the media service from the CDS 175 or maintains a current state if the media service is already inactive (block 435). Deactivating the media service may include any one of the devices 105, 125, or 145 detecting that either the DND mode or the tracking service is inactive, and transmitting a message to the server 155 to indicate that the media service is no longer authorized. In an embodiment, deactivating the media service may include any one of the devices 105, 125, or 145 detecting that either the DND mode or the tracking service is inactive, and transmitting a message to the server 155 carrying the relevant status. The server 155 may then respond to receiving the message by sending a message to the CDS 175 indicating that the media service is not authorized, and the CDS 175 may respond by stopping the media service. After block 435, the system 100 returns to the beginning of step 425 to maintain a synchronized state between the media delivery service and the drive tracking service and the DND mode.

If both the drive tracking service is active and the DND mode is active, the system 100 activates the media service from the CDS 175 or maintains a current state if the media service is already active (block 445). Activating the media service may include any one of the devices 105, 125, or 145 detecting that both the DND mode and the tracking service is active, and transmitting a message to the server 155 to indicate that the media service is authorized. In an embodiment, activating the media service may include any one of the devices 105, 125, or 145 detecting the status of the DND mode and the drive tracking service, and transmitting a message to the server 155 carrying the statuses. The server 155 may then respond to receiving the message by sending a message to the CDS 175 indicating that the media service is authorized, and the CDS 175 may respond by initiating the media service. After block 445, the system 100 returns to the beginning of step 425 to maintain a synchronized state between the media delivery service and the drive tracking service and the DND mode.

The media service may be any suitable audio streaming or delivery service, such as a music streaming service, a podcast streaming service, etc. In some embodiments, the media service plays audio local to the environment 104 (e.g., audio stored locally to the mobile device 105).

V. Additional Considerations

With the foregoing, an insurance customer may opt-in to a rewards, insurance discount, or other type of program. After the insurance customer provides their affirmative consent, an insurance provider remote server may collect data from the customer's mobile device, smart home controller, or other smart devices—such as with the customer's permission or affirmative consent. The data collected may be related to vehicle operation or insured assets before (or after) an insurance-related event, including those events discussed elsewhere herein. In return, risk averse insureds may receive discounts or insurance cost savings related to vehicle, life or other types of insurance from the insurance provider.

When implemented in software, any of the applications, services, and engines described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the example systems described herein are described as being implemented in software executed on a processor of one or more computer devices, persons of ordinary skill in the art will readily appreciate that the examples provided are not the only way to implement such systems.

Referencing the method 400 specifically, the described functions may be implemented, in whole or in part, by the devices, circuits, or routines of the system 100 shown in FIG. 1. The described method may be embodied by a set of circuits that are permanently or semi-permanently configured (e.g., an ASIC or FPGA) to perform logical functions of the respective method or that are at least temporarily configured (e.g., one or more processors and a set instructions or routines, representing the logical functions, saved to a memory) to perform the logical functions of the respective method.

While the present invention has been described with reference to specific examples, which are intended to be illustrative only and not to be limiting of the invention, it will be apparent to those of ordinary skill in the art that changes, certain additions or deletions may be made to the disclosed embodiments without departing from the spirit and scope of the invention. Further, although the forgoing text sets forth a detailed description of numerous different embodiments, it should be understood that the scope of the patent is defined by the words of the claims set forth at the end of this patent and their equivalents. The detailed description is to be construed as exemplary only and does not describe every possible embodiment because describing every possible embodiment would be impractical, if not impossible.

Throughout this specification, plural instances may implement components, operations, or structures described as a single instance. Although individual operations of one or more methods are illustrated and described as separate operations, one or more of the individual operations may be performed concurrently in certain embodiments.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Further, the phrase "wherein the system includes at least one of X, Y, or Z" means the system includes an X, a Y, a Z, or some combination thereof. Similarly, the phrase "wherein the component is configured for X, Y, or Z" means that the component is configured for X, configured for Y, configured for Z, or configured for some combination of X, Y, and Z.

In addition, use of the "a" or "an" are employed to describe elements and components of the embodiments herein. This description, and the claims that follow, should be read to include one or at least one. The singular also includes the plural unless it is obvious that it is meant otherwise.

In various embodiments, hardware systems described herein may be implemented mechanically or electronically. For example, a hardware system may comprise dedicated circuitry or logic that is permanently configured (e.g., as a special-purpose processor, such as a field programmable gate array (FPGA) or an application-specific integrated circuit (ASIC) to perform certain operations). A hardware system may also comprise programmable logic or circuitry (e.g., as encompassed within a general-purpose processor or other programmable processor) that is temporarily configured by software to perform certain operations. It will be appreciated that the decision to implement a hardware system mechanically, in dedicated and permanently configured circuitry, or in temporarily configured circuitry (e.g., configured by software) may be driven by cost and time considerations.

Further, the patent claims at the end of this document are not intended to be construed under 35 U.S.C. § 112(f) unless traditional means-plus-function language is expressly recited, such as "means for" or "step for" language being explicitly recited in the claim(s). At least some aspects of the systems and methods described herein are directed to an improvement to computer functionality, and improve the functioning of conventional computers.

VI. General Terms and Phrases

Throughout this specification, some of the following terms and phrases are used.

Cloud/Cloud Computing. The phrase "cloud computing" generally refers to a variety of concepts involving a large number of computers connected through a network (e.g., the Internet). In common usage, "the cloud" is often a metaphor for the Internet. "In the cloud" often refers to software, platforms, and infrastructure sold "as a service" (i.e., remotely through the Internet). The supplier of these services generally utilizes servers hosting products and services from a remote location, enabling individual users to access these products and services via the servers while requiring the users to install little if any software on their end-user devices. Example models of cloud computing services may be referred to as "software as a service," "platform as a service," and "infrastructure as a service." Cloud services may be offered in a public, private, or hybrid networks and may be implemented on hosts provided by third-party cloud vendors.

Communication Interface. Some of the described devices or systems include a "communication interface" (sometimes referred to as a "network interface"). For example, each of the systems 105, 125, 145, 155, and 175 may include a communication interface. Each of the described communication interfaces enables the system of which it is a party to (i) send information or data to other systems or components or (ii) receive information or data from other systems or components. A communication interface configured to enable a system to couple to a peripheral device (e.g., a keyboard, a monitor, an external hard drive, etc.) may be referred to as a "peripheral interface" or "I/O interface" (see "I/O interface"). In some instances, one or more of the described communication interfaces may be utilized to establish a direct connection to another system. In some instances, one or more of the described communication interfaces enable the system(s) of which they are a part to connect via a link to a network (e.g., a personal area network (PAN), a local area network (LAN), or a wide area network (WAN)).

If desired, the described communication interfaces may include (i) circuitry that enables connection to a wired link that carries electrical or optical signals to another device (e.g., via a coax cable or fiber optic cable) and to communicate with that other device, or (ii) circuitry that enables wireless communication (e.g., short-range or long-range communication) via electromagnetic signals, such as radio frequency (RF) signals. Further, in some instances a described communication interface may refer to multiple interfaces for communicating with components or systems external to a system. For example, in some instances, a described communication interface may refer to a set of communication interfaces including: one or more wired communication interfaces, one or more wireless communication interfaces, and one or more I/O or peripheral interfaces. The described communication interfaces and systems may conform to any one or more suitable communications protocols, standards, or technologies, such as those described herein Communication Protocols. In this description, communication protocols, standards, and technologies may be referred to generically as "communication protocols."

Example communication protocols, standards, or technologies that may be utilized by the described systems include those that facilitate communication via nanoscale networks, near-field networks, personal area networks ("PANs"), local area networks ("LANs"), backbone networks, metropolitan area networks ("MANs"), wide area networks ("WANs"), Internet area networks ("IANs"), or the Internet.

Example near-field network protocols and standards include typical radio-frequency identification ("RFID") standards or protocols and near-field communication ("NFC") protocols or standards. Example PAN protocols and standards include 6LoWPAN, Bluetooth (i.e., a wireless standard for exchanging data between two devices using radio waves in the range of approximately 2.4 to 2.485 GHz), IEEE 802.15.4-2006, ZigBee, the Thread protocol, ultra-wideband ("UWB"), universal serial bus ("USB") and wireless USB, and ANT+. Example LAN protocols and standards include the 802.11 protocol and other high frequency protocols/systems for wireless communication in bands found in a range of approximately 1 GHz-60 GHz (e.g., including the 900 MHz, 2.4 GHz, 3.6 GHz, 5 GHz, or 60 GHz bands), as well as standards for suitable cabling such as coaxial and fiber-optic cabling. Example technologies used to facilitate wireless WANs includes those used for LANs, as well as 2G (e.g., GPRS and EDGE), 3G (e.g., UMTS and CDMA2000), 4G (e.g., LTE and WiMax), and 5G (e.g., IMT-2020) technologies. Note, the Internet may be considered a WAN.

Other communication protocols and standards that may be utilized include BitTorrent, Bluetooth Bootstrap Protocol ("BOOTP"), Domain Name System ("DNS"), Dynamic Host Configuration Protocol ("DHCP"), Ethernet, file transfer protocol ("FTP"), hypertext transfer protocol ("HTTP"), infrared communication standards (e.g., IrDA or IrSimple), transmission control protocol/internet protocol ("TCP/IP") (e.g., any of the protocols used in each of the TCP/IP layers), real-time transport protocol ("RTP"), real-time streaming protocol ("RTSP"), Simple Mail Transfer Protocol ("SMTP"), Simple Network Management Protocol ("SNMP"), Simple Network Time Protocol ("SNTP"), secure shell protocol ("SSH"), and any other communications protocol or standard, or any combination thereof.

Communication Link. Unless otherwise stated, a "communication link" or a "link" is a pathway or medium connecting two or more nodes. A link may be a physical link or a logical link. A physical link is the interface or medium(s) over which information is transferred, and may be wired or wireless in nature. Example physicals links include (i) wired links such as cables with a conductor for transmission of electrical energy or a fiber optic connections for transmission of light and (ii) wireless links such as wireless electromagnetic signals that carry information via changes made to one or more properties of electromagnetic waves.

As noted, a wireless link may be a wireless electromagnetic signal that carries information via changes made to one or more properties of an electromagnetic wave(s). A wireless electromagnetic signal may be a microwave or radio wave and may be referred to as a radio frequency or "RF" signal. Unless otherwise stated, described RF signals may oscillated at a frequency within any one or more bands found in the spectrum of roughly 30 kHz to 3,000 GHz (e.g., an 802.11 signal in the 2.4 GHz band). Example RF bands include the low frequency ("LF") band at 30-300 kHz, the medium frequency ("MF") band at 300-3,000 kHz, the high frequency ("HF") band at 3-30 MHz, the very high frequency ("VHF") band at 30-300 MHz, the ultra-high frequency ("UHF") band at 300-3,000 MHz, the super high frequency ("SHF") band at 3-30 GHz, the extremely high frequency ("SHF") band at 30-300 GHz, and the tremendously high frequency ("THF") band at 300-3,000 GHz.

A logical link between two or more nodes represents an abstraction of the underlying physical links or intermediary nodes connecting the two or more nodes. For example, two or more nodes may be logically coupled via a logical link. The logical link may be established via any combination of physical links and intermediary nodes (e.g., routers, switches, or other networking equipment).

A link is sometimes referred to as a "communication channel." In a wireless communication system, the term "communication channel" (or just "channel") generally refers to a particular frequency or frequency band. A carrier signal (or carrier wave) may be transmitted at the particular frequency or within the particular frequency band of the channel. In some instances, multiple signals may be transmitted over a single band/channel. For example, signals may sometimes be simultaneously transmitted over a single band/channel via different sub-bands or sub-channels. As another example, signals may sometimes be transmitted via the same band by allocating time slots over which respective transmitters and receivers use the band in question.

Computer. Generally speaking, a computer or computing device is a programmable machine having two principal characteristics. Namely, it responds to a set of instructions in a well-defined manner and can execute a prerecorded list of instructions (e.g., a program or routine). A computer according to the present disclosure is a device with a processor and a memory. For purposes of this disclosure, examples of a computer include a server host, a personal computer, (e.g., desktop computer, laptop computer, netbook), a mobile communications device (such as a mobile "smart" phone), and devices providing functionality through internal components or connection to an external computer, server, or global communications network (such as the Internet) to take direction from or engage in processes which are then delivered to other system components.

Database. Generally speaking, a "database" is an organized collection of data, generally stored and accessed electronically from a computer system. Generally, any suitable datastore may be referred to as a "database." This disclosure may describe one or more databases for storing information relating to aspects of the disclosure. The information stored on a database can, for example, be related to a private subscriber, a content provider, a host, a security provider, etc. A server (which may or may not be hosted on the same computer as the database) may act as an intermediary between the database and a client by providing data from the database to the client or enabling the client to write data to the database. One of ordinary skill in the art appreciates any reference to "a database" my refer to multiple databases, each of which may be linked to one another.

Display Device. Generally speaking, the terms "display device" or "display" refer to an electronic visual display device that provides visual output in the form of images, text, or video. The described display devices (e.g., 119, 139, 159, 169, 300) may be any display, screen, monitor, or projector suitable for displaying visual output (e.g., images or video output). Example displays include LED screens, LCD screens, CRT screens, projectors, heads up displays, smart watch displays, headset displays (e.g., VR goggles), etc.

Graphic User Interface (GUI). See "User Interface."

Memory and Computer-Readable Media. Generally speaking, as used herein the phrase "memory" or "memory device" refers to a system or device including computer-readable media or medium ("CRM"). "CRM" refers to a medium or media accessible by the relevant computing system for placing, keeping, or retrieving information (e.g., data, computer-readable instructions, program modules, applications, routines, etc). Note, "CRM" refers to media that is non-transitory in nature, and does not refer to disembodied transitory signals, such as radio waves.

The CRM may be implemented in any technology, device, or group of devices included in the relevant computing system or in communication with the relevant computing system. The CRM may include volatile or nonvolatile media, and removable or non-removable media. The CRM may include, but is not limited to, RAM, ROM, EEPROM, flash memory, or other memory technology, CD-ROM, digital versatile disks (DVD) or other optical disk storage, magnetic cassettes, magnetic tape, magnetic disk storage or other magnetic storage devices, or any other medium which can be used to store information and which can be accessed by the computing system. The CRM may be communicatively coupled to a system bus, enabling communication between the CRM and other systems or components coupled to the system bus. In some implementations the CRM may be coupled to the system bus via a memory interface (e.g., a memory controller). A memory interface is circuitry that manages the flow of data between the CRM and the system bus.

Message. When used in the context of communication networks, the term "message" refers to a unit of communication, represented by a set of data, transmitted or received by a node (e.g., via a link). The set of data representing the message may include a payload (i.e., the content intended to be delivered) and protocol overhead. The overhead may include routing information and metadata pertaining to the protocol or payload (e.g., identifying the protocol for the message, the intended recipient node, the originating node, the size of the message or payload, data integrity information for checking the integrity of the message, etc.). In some instances, a packet or sequence of packets may be thought of as a message.

Network. As used herein and unless otherwise specified, when used in the context of system(s) or device(s) that communicate information or data, the term "network" refers to a collection of nodes (e.g., devices or systems capable of sending, receiving or forwarding information) and links which are connected to enable telecommunication between the nodes.

Each of the described networks (e.g., the networks 101 and 199) may include dedicated routers, switches, or hubs responsible for forwarding or directing traffic between nodes, and, optionally, dedicated devices responsible for configuring and managing the network. Some or all of the nodes of the described networks may be adapted to function as routers in order to direct traffic sent between other network devices. Nodes of the described networks may be inter-connected in a wired or wireless manner, and may have different routing and transfer capabilities. For example, dedicated routers may be capable of high-volume transmissions while some nodes may be capable of sending and receiving relatively little traffic over the same period of time. Additionally, the connections between nodes on the described networks may have different throughput capabilities and different attenuation characteristics. A fiberoptic cable, for example, may be capable of providing a bandwidth several orders of magnitude higher than a wireless link because of the difference in the inherent physical limitations of the medium. Each of the described networks may include networks or sub-networks, such as a local area network (LAN) or a wide area network (WAN).

Node. Generally speaking, the term "node" refers to a connection point, redistribution point, or a communication endpoint. A node may be any device or system (e.g., a computer system) capable of sending, receiving or forwarding information. For example, end-devices or end-systems that originate or ultimately receive a message are nodes. Intermediary devices that receive and forward the message (e.g., between two end-devices) are also generally considered to be "nodes."

Processor. The various operations of example methods described herein may be performed, at least partially, by one or more processors. Generally speaking, the terms "processor" and "microprocessor" are used interchangeably, each referring to a computer processor configured to fetch and execute instructions stored to memory. By executing these instructions, the processor(s) can carry out various operations or functions defined by the instructions. The processor(s) may be temporarily configured (e.g., by instructions or software) or permanently configured to perform the relevant operations or functions (e.g., a processor for an Application Specific Integrated Circuit, or ASIC), depending on the particular embodiment. A processor may be part of a chipset, which may also include, for example, a memory controller or an I/O controller. A chip set is a collection of electronic components in an integrated circuit that is typically configured to provide I/O and memory management functions as well as a plurality of general purpose or special purpose registers, timers, etc. Generally speaking, one or more of the described processors may be communicatively coupled to other components (such as memory devices and I/O devices) via a system bus.

The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

Words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Routine. Unless otherwise noted, a "routine," "module," or "application" described in this disclosure refers to a set of computer-readable instructions that may be stored on a CRM. Generally, a CRM stores computer-readable code ("code") representing or corresponding to the instructions, and the code is adapted to be executed by a processor to facilitate the functions described as being represented by or associated with the routine or application. Each routine or application may be implemented via a stand-alone executable file, a suite or bundle of executable files, one or more non-executable files utilized by an executable file or program, or some combination thereof. In some instances, unless otherwise stated, one or more of the described routines may be hard-coded into one or more EPROMs, EEPROMs, application specific integrated circuits (ASICs), field programmable gate arrays (FPGAs), or any other hardware or firmware elements.

Further, unless otherwise stated, each routine or application may be embodied as: (i) a stand-alone software program, (ii) a module or sub-module of a software program, (iii) a routine or sub-routine of a software program, or (iv) a resource invoked or accessed by a software program via a "call" to thereby cause the system to implement the task or function associated with the resource. The call may be (i) a "function call" that is invoked to cause execution of a resource (e.g., set of instructions) stored at a library accessible by the software program; (ii) a "system call" that is invoked to cause execution of a system resource (e.g., often running in privileged kernel space and only executable only by the operating system); (iii) a "remote call" that is invoked to cause a logical or physical entity with a different address space to execute a resource; or (iv) some combination thereof. As an example, a routine executed by a processor of a device may invoke a "remote call" to cause execution of a resource at (i) a second device (e.g., a server host, an end-user device, a networking device, a peripheral device in communication with the device, or some other physical device); (ii) a virtual-machine on the same or different device; (iii) a processor (e.g., CPU or GPU) that is different from the original processor and that may be internal or external to the device executing the routine; or (iv) some combination thereof.

Each routine may be represented by code implemented in any desired language, such as source code (e.g., interpretable for execution or compilable into a lower level code), object code, bytecode, machine code, microcode, or the like. The code may be written in any suitable programming or scripting language (e.g., C, C++, Java, Actionscript, Objective-C, Javascript, CSS, Python, XML, Swift, Ruby, Elixir, Rust, Scala, or others).

Server. Generally speaking, a server is a program or set of routines that manages network resources or services to provide functionality for other programs or devices called "clients." Servers are typically hosted by a host computer, and this host computer may itself be referred to as a "server." Example servers include database servers, file servers, mail servers, print servers, web servers, game servers, and application servers. Servers may be dedicated (e.g., wherein the software and hardware are used exclusively or nearly exclusively for server functions) or virtual (e.g., wherein the server is hosted by a virtual machine on a physical machine or wherein the server shares hardware or software resources of a single machine with another operating system).

User Interface (UI). Generally speaking, a user interface refers to the components of a computer system by which a user and the computer system interact. The UI components may be hardware, software, or some combination thereof, and may include UI input components, UI output components, or some combination thereof. In some embodiments, any one or more of the UI components 115, 135, or 165 shown in FIG. 1 may include any one or more of the example UI components listed below.

Example UI output components include: (i) visual output components such as lights (e.g., LEDs) and electronic displays (e.g., LCD, LED, CRT, plasma, projection displays, heads-up displays, etc.), (ii) audio output components such as speakers, and (iii) motion generating components such as motors that provide haptic feedback.

Example UI input components include: (i) mechanical or electrical components for detecting physical or touch input, such as hardware actuators (e.g., those used for a keyboard, a mouse, "hard" buttons found on a tablet or phone, etc.) or electrical sensors (e.g., resistive or capacitive touch sensors); (ii) audio sensors (e.g., microphones) for detecting audio input, such as voice commands; (iii) image sensors for detecting image or video input, such as those found in a camera (e.g., enabling facial recognition input or gesture input without requiring the user to touch the device); and (iv) motion sensors (e.g., accelerometers, gyroscopes, etc.) for detecting motion of the computer system itself (e.g., enabling a user to provide input by rotating or otherwise moving the computer system).

Some systems (e.g., the mobile device 105, the OBC 125, etc.) provide a graphical user interface (GUI) by way of a UI output component such as an electronic display (e.g., any of the displays 119, 139, 169, or 300). Generally speaking, a GUI is generated via a routine and enables a user to interact with indicators and other graphic elements displayed on at the electronic display. Generally speaking, the graphic elements of a GUI may be output elements (i.e., conveying some sort of information to the user), control elements (i.e., being user "interactable" to cause the execution of an action by the system), or both (e.g., an icon may include an image representing a browser and may be interacted with to launch the browser).

Example GUI control elements include buttons (e.g., radio buttons, check boxes, etc.), sliders, list boxes, spinner elements, drop-down lists, menus, menu bars, toolbars, interactive icons, text boxes, windows that can be moved or minimized and maximized, etc.

What is claimed is:

1. A system for a media service at a vehicle during driving sessions of the vehicle, the system comprising:
a mobile device configured to:
track a first status of a drive tracking service, wherein the drive tracking service is automatically activated in response to at least one trigger;
track a second status of the mobile device; and
automatically synchronize the media service with the first status of the drive tracking service and the second status of the mobile device comprising:
transmit a message to a server to activate the media service to provide media content in a manner receivable by a user in the vehicle when at least one condition of a set of conditions is true, wherein the set of conditions comprises: (1) a first condition that (a) is true when the first status indicates the drive tracking service is active and (b) is otherwise false, and (2) a second condition that (a) is true when the second status indicates the mobile device is in a do-not-disturb ("DND") mode and (b) is otherwise false; and
transmit another message to the server to deactivate the media service to stop providing the media content when each condition of the set of conditions is not true.

2. The system of claim 1, wherein the DND mode is a state of operation of the mobile device that prevents the mobile device from receiving one or more calls or data.

3. The system of claim 1, wherein the DND mode is a state of operation of the mobile device in which a volume of a first notification in the DND mode is lower than the volume of a second notification in a second mode different from the DND mode.

4. The system of claim 1, wherein the DND mode is a state of operation of the mobile device in which audio notifications are deactivated or muted.

5. The system of claim 1, wherein the mobile device is further configured to:
automatically activate the DND mode of the mobile device when the vehicle is started or moving.

6. The system of claim 1, wherein to track the first status of the drive tracking service further comprises indicating whether or not a vehicle monitor is tracking the vehicle being operated; and
wherein:
the media content comprises selected media content, and wherein the selected media content comprises at least one of an audio media content, a video content, an image content, a game, one or more augmented-reality graphics, or a map; or
the at least one trigger comprises one or more of (i) detecting a communication connection between the mobile device and another device or (ii) detecting a preconfigured setting to start the drive tracking service.

7. The system of claim 1, further comprising:
a vehicle monitor device comprising an image sensor that is directed to a cockpit of the vehicle and configured to capture images of a head of a driver of the vehicle, wherein the drive tracking service is configured to estimate a head pose or an eye gaze of the driver based on the images, as captured.

8. The system of claim 7, wherein the vehicle monitor device comprises a plurality of sensors for tracking driving behaviors of the vehicle.

9. A method for a media service at a vehicle during driving sessions of the vehicle, the method comprising:
tracking a first status of a drive tracking service, the drive tracking service configured to track vehicle operation of the vehicle, wherein the drive tracking service is automatically activated in response to at least one trigger;
tracking a second status of a mobile device associated with a user; and
automatically synchronizing the media service with the first status of the drive tracking service and the second status of the mobile device by at least:
transmitting a message to a server to activate the media service to provide media content in a manner receivable by the user when at least one condition of a set of conditions is true, wherein the set of conditions comprises: (1) a first condition that (a) is true when the first status indicates the drive tracking service is active and (b) is otherwise false, and (2) a second condition that (a) is true when the second status indicates the mobile device is in a do-not-disturb ("DND") mode and (b) is otherwise false; and
transmitting another message to the server to deactivate the media service to stop providing the media content when each condition of the set of conditions is not true.

10. The method of claim 9, wherein the DND mode is a state of operation of the mobile device that prevents the mobile device from receiving one or more calls or data.

11. The method of claim 9, wherein the DND mode is a state of operation of the mobile device in which a volume of a first notification in the DND mode is lower than the volume of a second notification in a second mode different from the DND mode.

12. The method of claim 9, wherein the DND mode is a state of operation of the mobile device in which audio notifications are deactivated or muted.

13. The method of claim 9, further comprising:
automatically activating the DND mode of the mobile device when the vehicle is started or moving.

14. The method of claim 9, wherein tracking the first status of the drive tracking service further comprises indicating whether or not a vehicle monitor is tracking the vehicle being operated; and
wherein:
the media content comprises selected media content, and wherein the selected media content comprises at least one of an audio media content, a video content, an image content, a game, one or more augmented-reality graphics, or a map; or
the at least one trigger comprises one or more of (i) detecting a communication connection between the mobile device and another device or (ii) detecting a preconfigured setting to start the drive tracking service.

15. A system for a media service at a vehicle during driving sessions of the vehicle, the system comprising:
a content server configured to:
receive a message comprising an indication of a status of a mobile device;
determine whether the status of the mobile device indicates that the mobile device is in a do-not-disturb ("DND") mode;
if the status of the mobile device indicates that the mobile device is in the DND mode, activate the media service to provide media content in a manner receivable by a user in the vehicle; and
if the status of the mobile device indicates that the mobile device is not in the DND mode, deactivate the media service if the media service is activated.

16. The system of claim 15, wherein the DND mode is a state of operation of the mobile device that prevents the mobile device from receiving one or more calls or data.

17. The system of claim 15, wherein the DND mode is a state of operation of the mobile device in which a volume of a first notification in the DND mode is lower than the volume of a second notification in a second mode different from the DND mode.

18. A system for a media service at a vehicle during driving sessions of the vehicle, the system comprising:
a means for storing data thereon; and
a means for performing operations comprising:
tracking a first status of a drive tracking service, wherein the drive tracking service is automatically activated in response to at least one trigger;
tracking a second status of a mobile device; and
automatically synchronizing the media service with the first status of the drive tracking service and the second status of the mobile device, comprising:
transmit a message to a server to activate the media service to provide media content in a manner receivable by a user in the vehicle when at least one condition of a set of conditions is true, wherein the set of conditions comprises: (1) a first condition that (a) is true when the first status indicates the drive tracking service is active and (b) is otherwise false, and (2) a second condition that (a) is true when the second status indicates the mobile device is in a do-not-disturb ("DND") mode and (b) is otherwise false; and
transmit another message to the server to deactivate the media service to stop providing the media content when each condition of the set of conditions is not true.

19. The system of claim 18, wherein the DND mode is a state of operation of the mobile device that prevents the mobile device from receiving one or more calls or data.

20. The system of claim 18, wherein the DND mode is a state of operation of the mobile device in which a volume of a first notification in the DND mode is lower than the volume of a second notification in a second mode different from the DND mode.

21. The system of claim 18, wherein the DND mode is a state of operation of the mobile device in which audio notifications are deactivated or muted.

\* \* \* \* \*